(12) United States Patent
Hori

(10) Patent No.: US 7,072,962 B2
(45) Date of Patent: Jul. 4, 2006

(54) PROXY REPLY METHOD AND APPARATUS

(75) Inventor: Takayuki Hori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 10/093,487

(22) Filed: Mar. 11, 2002

(65) Prior Publication Data

US 2003/0088679 A1  May 8, 2003

(30) Foreign Application Priority Data

Nov. 6, 2001 (JP) ............................. 2001-340604

(51) Int. Cl.
*G06F 15/173* (2006.01)

(52) U.S. Cl. ...................... 709/224; 709/203; 709/225; 709/217

(58) Field of Classification Search ............... 707/9, 707/10, 200, 205, 204; 713/200–201; 709/235, 709/236, 224, 229, 203, 225, 217; 370/390, 370/338; 380/25
See application file for complete search history.

(56) References Cited

U.S. PATENT DOCUMENTS

| | | | | |
|---|---|---|---|---|
| 5,604,803 A | * | 2/1997 | Aziz ............................ 380/25 |
| 5,689,566 A | * | 11/1997 | Nguyen ....................... 380/25 |
| 5,848,227 A | * | 12/1998 | Sheu ............................. 714/4 |
| 6,070,243 A | * | 5/2000 | See et al. ................... 713/201 |
| 6,119,160 A | * | 9/2000 | Zhang et al. ............... 709/224 |
| 6,161,185 A | * | 12/2000 | Guthrie et al. ............. 713/201 |
| 6,633,572 B1 | * | 10/2003 | Olshansky et al. ......... 370/401 |
| 6,665,278 B1 | * | 12/2003 | Grayson ..................... 370/328 |

* cited by examiner

*Primary Examiner*—Cam-Y Truong
(74) *Attorney, Agent, or Firm*—Staas & Halsey LLP

(57) ABSTRACT

This invention is to prevent the network traffic at the fault from increasing. As for this invention, if a packet is received from an access server 3, an accounting server 13a of a transfer destination is specified from a user ID included in the packet data, and then the packet based on the packet data is transmitted to the accounting server 13a of the transfer destination. If a response is not received from the accounting server 13a of the transfer destination in a predetermined period, the packet data is stored into a proxy reply list, and also a response corresponding to the packet data is generated and is transmitted to the access server 3. Then, the packet data stored in the proxy reply list is read out at a predetermined timing and the accounting server 13a of the transfer destination is specified from the user ID included in the packet data, and the packet based on the read packet data is transmitted to the accounting server 13a of the transfer destination. If a response is received from the accounting server 13a of the transfer destination in the predetermined period, the response and the packet data in the proxy reply list are discarded.

18 Claims, 10 Drawing Sheets

ACER: ACCOUNTING END REQUEST
ACRP: ACCOUNTING RESPONSE

ACRQ: ACCOUNTING REQUEST
ACRP: ACCOUNTING RESPONSE

| GROUP NAME | COMPANY A | | COMPANY B | |
|---|---|---|---|---|
| NAME OF ACCOUNTING SERVER | Rad 1 | Rad 2 | Rad 3 | Rad 4 |
| STATUS | up | up | down | up |
| NUMBER OF TIMES OF RETRY | 0 | 0 | 2 | 0 |

FIG.8

| DATA NAME | DATA |
|---|---|
| TIME OF RECEIPT | 2001/8/10 13:30 |
| User-Name | XXXX@aaa.com |
| Service-Type | 0 |
| Framed-Protocol | 1 |
| Framed-IP-Address | 65.180.11.114 |
| Framed-IP-Netmask | NULL |
| Framed-Routing | NULL |
| Filter-Id | NULL |
| Framed-MTU | NULL |
| Login-IP-Host | NULL |
| Login-Service | NULL |
| Login-TCP-Port | NULL |
| Callback-Number | NULL |
| Callback-Id | NULL |
| Framed-Route | NULL |
| Framed-IPX-Network | NULL |
| Class | NULL |
| Vendor-Specific | NULL |
| Session-Timeout | NULL |
| Idle-Timeout | NULL |
| Termination-Action | NULL |
| Called-Station-Id | NULL |
| Proxy-State | NULL |
| Login-LAT-Group | NULL |
| Framed-AppleTalk-Link | NULL |
| Framed-AppleTalk-Network | NULL |
| Framed-AppleTalk-Zone | NULL |
| Acct-Status-Type | 4 |
| Acct-Delay-Time | 0 |
| Acct-Input-Octets | 38271 |
| Acct-Session-Id | 355506525 |
| Acct-Authentic | 1 |
| Acct-Session-Time | 370 |
| Acct-Input-Packets | 986 |
| Acct-Output-Packets | 712 |
| Acct-Terminate-Cause | 1 |
| Acct-Multi-Session-Id | NULL |
| Acct-Link-Count | NULL |

FIG.9

PROXY REPLY METHOD AND APPARATUS

TECHNICAL FIELD OF THE INVENTION

This invention relates to a technique for proxy reply in computers which relay packets.

BACKGROUND OF THE INVENTION

When a RADIUS (Remote Authentication Dial In-User Service) server receives user authentication information through, for example, a public network and an access server connected to the public network from a user terminal, it performs user Sax authentication processing and connection control, such as DNS (Domain Name System) server designation and PPP (Point-to-Point Protocol) connection designation, and acquires information which is necessary for accounting. If these processings are completed, for example, the user terminal is permitted to connect to the Internet and/or is able to receive special services. A RADIUS protocol is regulated in "RFC (Request For Comments) 2865" and "RFC2866". The RADIUS Protocol uses UDP (User Datagram Protocol).

There exists a service which provides a network, which connects access servers installed at a plurality of access points, for example, for companies such as ISPs (Internet Service Providers). Companies which use this service can increase access means for their users, without making large changes to their own systems. Each company prepares the RADIUS server and connects it to the aforementioned network. To the network, a relay server is connected to distribute requests from users to RADIUS servers of companies which provide services for the users. This relay server records transfer results and grasps the amount of use precisely to do accurate accounting, and confirms and changes contents of packets.

In such an environment, if the RADIUS server of one company gets down by the fault and so on, an access server can not acquire a response for a request, so the access server resends packets for the same request repeatedly. Therefore, network traffic increases, and it causes the decline of response speed even toward RADIUS servers of other companies which are working normally. In addition, usually sent packets are managed by the access server, but a buffer overflow may occur in the access server due to the increase of traffic by resending the packet, and consequently, some packets may be lost and the relay server may be unable to do accounting accurately. The service provider has to examine log data of the relay server and/or the access server and to look for the packets sent at the fault, and then, it has to notify companies of the information concerning the packets. However, there are so many packets that the service provider often cannot perform these works. Thus, the increase of traffic at the fault has so many problems.

SUMMARY OF THE INVENTION

Therefore, an object of this invention is to provide a technique preventing the increase of traffic at the fault.

And, another object of this invention is to provide a technique for preventing resending of packets that causes the increase of traffic at the fault.

Furthermore, another object of this invention is to provide a technique preventing loss of packets for accounting requests and enabling to acquire accurate accounting information.

To solve aforementioned objects, a proxy reply method of this invention includes steps of: if a packet is received from a first computer (e.g. the access server in the preferred embodiment or a network device such as a router), specifying a second computer of a transfer destination (e.g. an accounting server (the RADIUS server) in the preferred embodiment) from user identification information included in the packet data; transmitting the packet based on the packet data to the specified second computer of the transfer destination; and if a response is not received from the second computer of the transfer destination within a predetermined period, storing the packet data into a storage device (e.g. a proxy reply list in the preferred embodiment), and generating and sending a response corresponding to the packet data to the first computer.

If these processings are performed, the first computer can acquire the response, and it prevents resending packets repeatedly and causing the congestion of the network. In addition, since the packet data is stored in the storage device, a computer which performs proxy reply can send the packet to the second computer later.

In addition, this invention may further comprise steps of: reading out the packet data stored in the storage device at a predetermined timing, and specifying the second computer of the transfer destination from user identification information included in the packet data; sending a packet based on the read packet data to the specified second computer of the transfer destination; and if a response is received from the second computer of the transfer destination within the predetermined period, discarding the response and the packet data, which corresponds to the response and is stored in the storage device.

If these processings are performed, the second computer performs processings as it replies normally. Namely, if this invention is adopted, the second computer does not need any modification. In addition, since the computer that performs proxy replay discards the response from the second computer, the first computer does not need any modification either.

In addition, this invention may further comprise a step of, by at least changing data which represents delay time and is included in the packet data stored in the storage device, based on elapsed time from when the packet data is received, generating a packet based on the read packet data.

If these processings are performed, the second computer can judge how late it received the packet. If the first computer sends, for example, a packet concerning an accounting request, the second computer can obtain time when the first computer sent the accounting request, and consequently, it can do accurate accounting.

This invention may further comprise a step of judging whether the packet data is data for the accounting request. The second computer may perform a double login check and so on, based on data that it acquires in response to receipt of the accounting request, so the accounting request is important on a point of doing an accurate login check as well as accurate accounting. Incidentally, as for the accounting request, there are one at the start and another at the end, but accounting request at the end is very important on a point of acquiring accurate accounting information.

Incidentally, the aforementioned method can be performed by a program, and this program is stored in a storage medium or a storage device such as a flexible disk, a CD-ROM, a magneto-optical disk, a semiconductor memory, a hard disk. And, it may be distributed through a network and so on. Incidentally, an intermediate processing result is stored in a storage device such as a memory temporarily.

BRIEF DESCRIPTION OF THE DRAWINGS

FIG. 8 is a diagram showing an example of a status table;

FIG. 9 is a diagram showing an example of data stored in a proxy reply list.

DETAIL DESCRIPTION OF THE PREFERRED EMBODIMENTS

Figure 1:
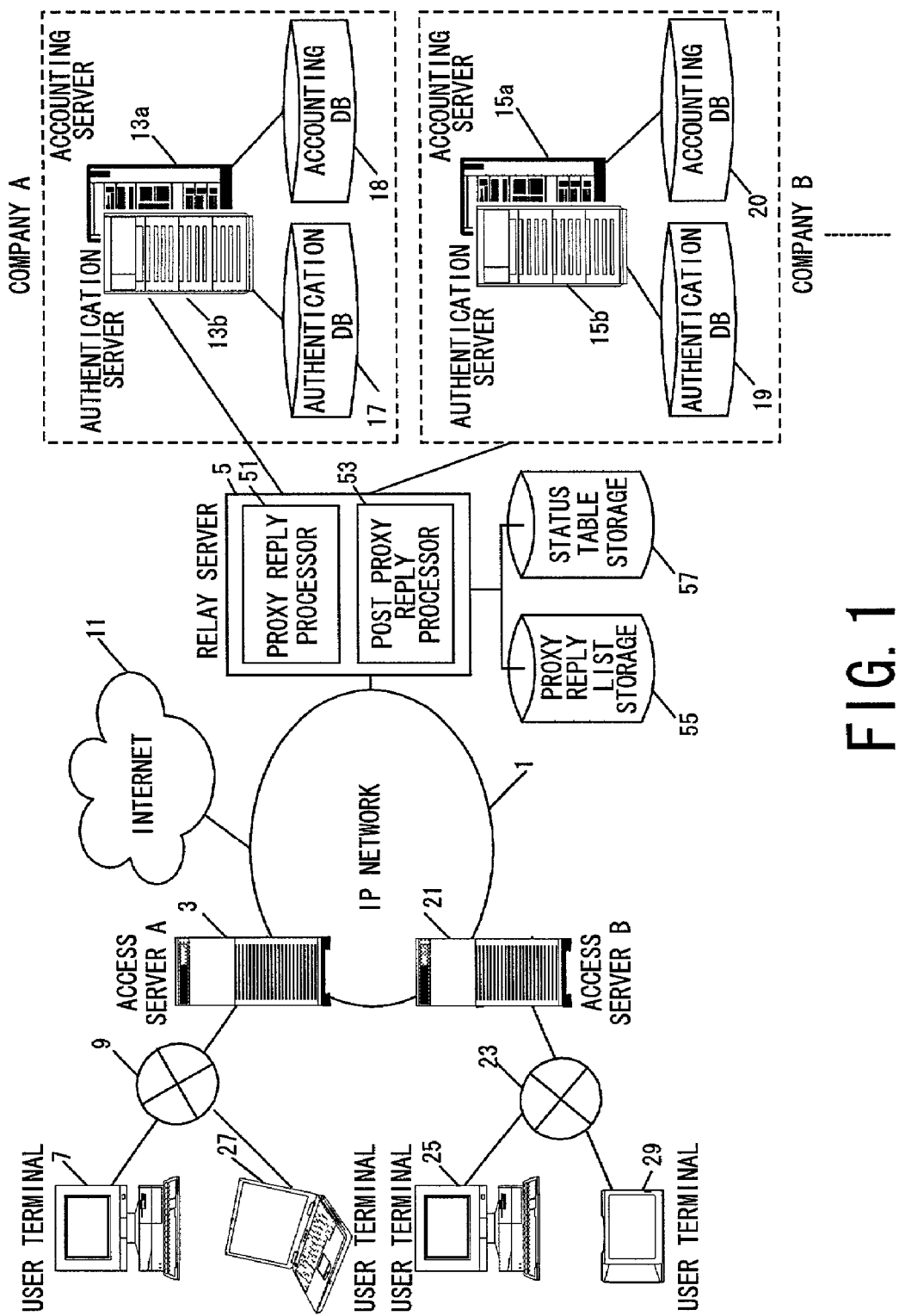
FIG. 1 is a diagram showing an example of a system configuration for a preferred embodiment of this invention.

A system outline figure for a preferred embodiment of this invention is shown in FIG. 1. A user terminal 7 such as a personal computer connects with an access server A (3) through a public network 9. And, also a user terminal 27 such as a notebook computer connects with the access server A (3) through the public network 9. A user terminal 25 such as a personal computer connects with an access server B (21) through a public network 23. And, also a user terminal 29 such as a PDA (Personal Digital Assistant) connects with the access server B (21) through the public network 23. The type and the number of terminals are not limited to these, and cellular phones may be used. In addition, access servers may be computers such as servers or network devices such as routers, but these are explained as computers here. In addition, the number of access servers which connect with the public network is not limited to two, and more access servers can be installed.

The access server A (3) and the access server B (21) are connected with an IP (Internet Protocol) network 1. The IP network 1 is connected with, for example, the Internet 11. And, the IP network 1 is connected with also a relay server 5. Only one relay server is installed in FIG. 1, but a plurality of relay servers may be installed. The relay server 5 is connected with an accounting server 13a and an authentication server 13b which are RADIUS servers of a company A. In addition, the relay server 5 is connected with an accounting server 15a and an authentication server 15b which are RADIUS servers of a company B. The number of RADIUS servers of companies, which are connected with the relay server 5, is not limited to two. Furthermore, for explanations, accounting servers and authentication servers are explained separately here, but their functions can be realized by one server. In addition, for backup or processing load distribution, one company may prepare a plurality of accounting servers and authentication servers. The accounting server 13a manages an accounting DB 18 which stores user accounting information of the company A, and the authentication server 13b manages an authentication DB 17 which stores user authentication information of the company A. The accounting server 15a manages an accounting DB 20 which stores user accounting information of the company B, and the authentication server 15b manages an authentication DB 19 which stores user authentication information of the company B.

The relay server 5 has a proxy reply processor 51 and a post proxy reply processor 53. Processings by these processors are explained with figures later. In addition, the relay server 5 has a proxy reply list storage 55, which stores packet data for a request to which the relay server 5 proxy-replied, and a status table storage 57, which stores a status table as to information for operating status of RADIUS servers to which the relay server 5 relays packets.

Next, the processing of an access server, which is the access server A (3) here, the relay server 5, an authentication server, which is the authentication server 13b here, and an accounting server, which is the accounting server 13a here, shown in the FIG. 1 is explained with reference to FIG. 2 to FIG. 4.

First, if the access server A (3) receives a login request from, for example, the user terminal 7, it generates and sends a packet of an authentication request (Access-Request) to the relay server 5 (Step (1)). If the relay server 5 receives the packet of the authentication request from the access server A (3), it stores the packet into a storage device temporarily, specifies a RADIUS server of a transfer destination according to user identification information such as a user ID included in the packet data, and performs processings such as changing a transmission destination of the packet. Then, the relay server transfers the packet of the authentication request to the authentication server 13b (Step (2)).

If the authentication server 13b receives the packet of the authentication request from the relay server 5, it stores the packet into the storage device temporarily, and performs an authentication processing based on data stored in the authentication DB 17 (Step (3)). The authentication processing is not different from the conventional ones at all, so any further explanation is omitted. It is assumed that the authentication was performed successfully. Then, the authentication server 13b generates and sends a packet of an authentication response (Access-Accept) to the relay server 5 (Step (4)). If the relay server 5 receives the packet of the authentication response from the authentication server 13b, it stores the packet into the storage device temporarily, by checking the packet data, specifies an access server of a transmission destination, which is the access server A (3) here, and performs processings such as changing a destination of the packet. Then, the relay server 5 transfers the packet of the authentication response to the access server A (3) (Step (5)). The access server A (3) receives the packet of the authentication response from the relay server 5. Up to these processings, the authentication is completed, and a PPP session is established (Step (6)).

Next, the access server A (3) generates and sends a packet of an accounting request (Accounting-Request), which represents a start (though it is mentioned later, the value of an attribute Acct-Status-Type is 1 (Start)), to the relay server 5 (Step (7)). If the relay server 5 receives the packet of the accounting request, which represents a start, from the access server A (3), it stores the packet into the storage device temporarily, specifies a RADIUS server of a transfer destination according to the user identification information such as the user ID included in the packet data, and performs processings such as changing a transmission destination of the packet. Then, the relay server 5 transfers the packet of accounting request, which represents a start, to the accounting server 13a (Step (8)).

If the accounting server 13a receives the packet of the accounting request, which represents a start, from the relay server 5, it stores the packet into a storage device temporarily, and performs an accounting processing (Step (9)). Namely, the accounting server 13a recognizes the start of accounting, and registers the start of accounting to the accounting DB 18. Then, the accounting server 13a generates and sends a packet of an accounting response (Accounting-Response) to the relay server 5 (Step (10)). If the relay server 5 receives the packet of the accounting response from the accounting server 13a, it stores the packet into the storage device temporarily, by checking the packet data, specifies an access server of a transmission destination, here access server A (3), and performs processings such as changing a transmission destination of the packet. Then, the relay server 5 transfers the packet of the accounting response to the access server A (3) (Step (11)). The access server A (3) receives the packet of the accounting response from the relay server 5. Up to these processings, the user terminal 7 can start communication (Step (12)). Namely, for example, the user terminal 7 can access to the Internet 11.

Meanwhile, if the access server A (3) receives a logoff request (e.g. a notice of an end of communication) from, for example, the user terminal 7, it generates and sends a packet of an accounting request (Accounting-Request), which represents an end (though it is mentioned later, the value of an attribute Acct-Status-Type is 2 (Stop)), to the relay server 5 (Step (21)). If the relay server 5 receives the packet of the accounting request, which represents an end, from the access server A (3), it stores the packet into the storage device temporarily, specifies a RADIUS server of a transfer destination according to the user identification information such as the user ID included in the packet data, and performs processings such as changing a transmission destination of the packet. Then, the relay server 5 transfers the packet of the authentication request, which represents an end, to the accounting server 13a (Step (22)).

If the accounting server 13a receives the packet of the accounting request, which represents an end, from the relay server 5, it stores the packet into a storage device temporarily, and performs an accounting processing (Step (23)). Namely, the accounting server 13a recognizes the end of accounting, and registers the end of accounting to the accounting DB 18. Then, the accounting server 13a generates and sends a packet of an accounting response (Accounting-Response) to the relay server 5 (Step (24)). If the relay server 5 receives the packet of the accounting response from the accounting server 13a, it stores the packet into the storage device temporarily, by checking the packet data, specifies an access server of a transmission destination, which is the access server A (3) here, and performs processings such as changing a transmission destination of the packet. Then, the relay server 5 transfers the packet of the accounting response to the access server A (3) (Step (25)). The access server A (3) receives the packet of the accounting response from the relay server 5. By these processings, the access server A (3) stops communicating with the user terminal 7 (Step (26)).

Figure 2:
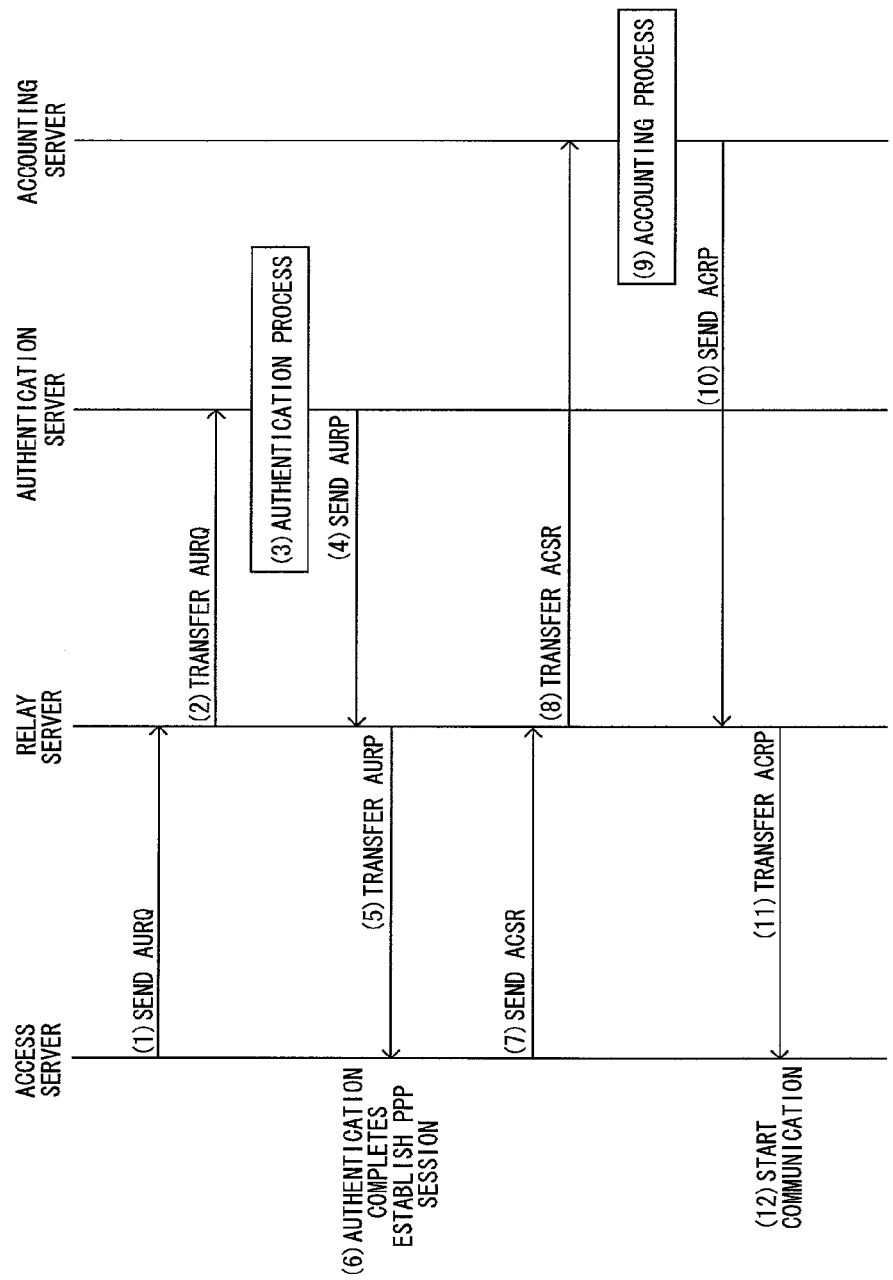
FIG. 2 is a diagram showing a first part of a whole processing flow.
Figure 3:
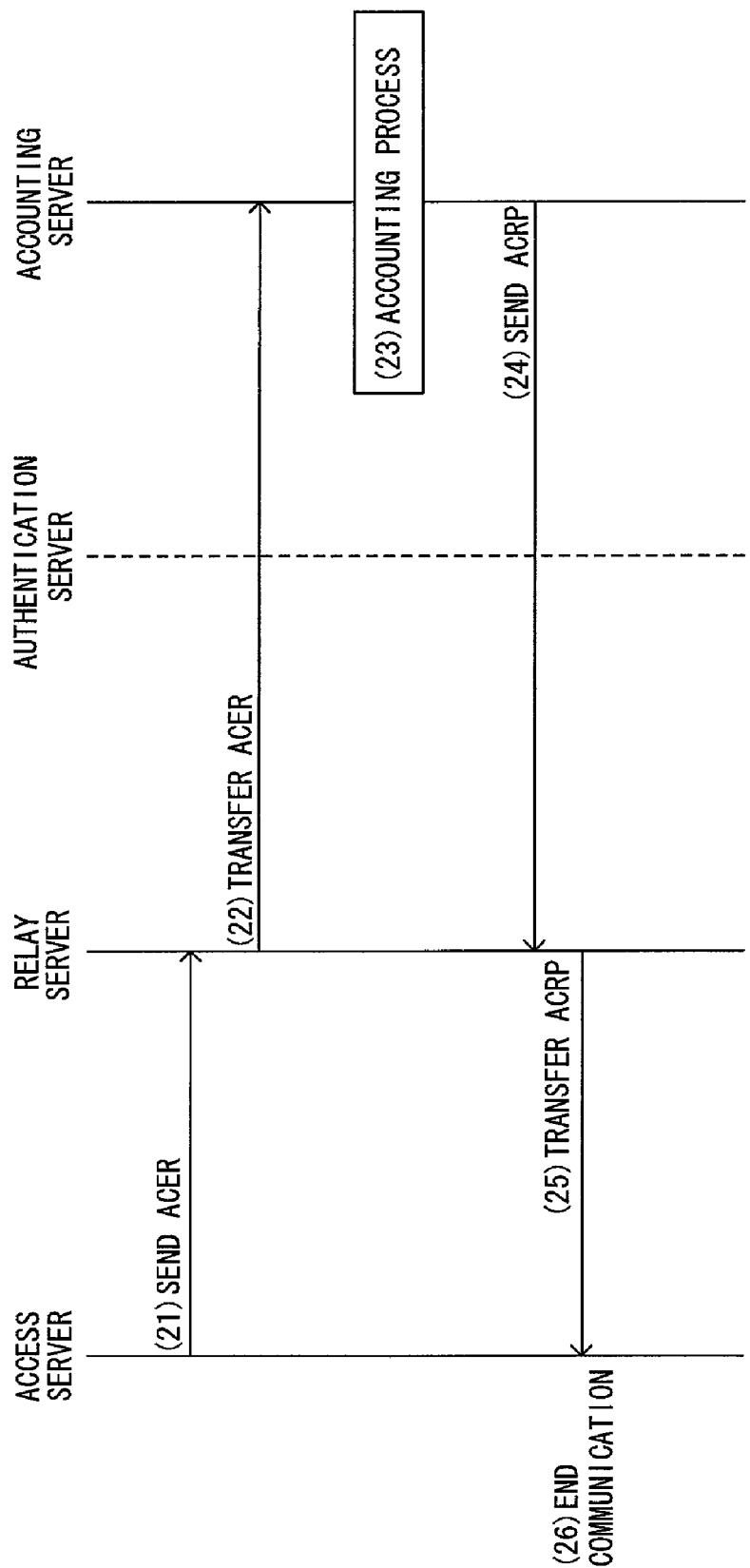
FIG. 3 is a diagram showing a second part of the whole processing flow.

FIG. 2 and FIG. 3 show processing flows in the case that the accounting server 13a and the authentication server 13b are working normally. If the accounting server 13a is down, processings such as ones of FIG. 4 are performed. Namely, if the access server A (3) generates a packet of an accounting request, it sends the packet to the relay server 5 (Step (31)). If the relay server 5 receives the packet of the accounting request from the access server A (3) it stores the packet into the storage device temporarily, specifies a RADIUS server of a transfer destination according to the user identification information such as the user ID included in the packet data, and performs processings such as changing a transmission destination of the packet. Then, the relay server 5 transfers the packet of the accounting request to the accounting server 13a (Step (32)).

But, since the accounting server 13a is down, there is no response. Therefore, after a predetermined period, the access server A (3) sends a packet of an accounting request to the relay server 5 (Step (31)). Incidentally, a session ID (an attribute value of Acct-Session-ID) of this accounting request is the same as the session ID of the previous accounting request, and delay time (an attribute value of Acct-Delay-time) is the value to which elapsed time from first transmission time of the packet is added. If the relay server 5 receives the packet of the accounting request from the access server A (3), it stores the packet into the storage device temporarily, specifies a RADIUS server of a transfer destination according to the user identification information such as the user ID included in the packet data, and performs processings such as changing a transmission destination of the packet. Then, the relay server 5 transfers the packet of the accounting request to the accounting server 13a (Step (32)).

Likewise, since the accounting server 13a is down, there is no response. Since the access server A (3) acquires no response, it must repeat the aforementioned processings. All the access servers which send accounting requests to the accounting server 13a perform the same processings. It causes the congestion over the IP network 1.

Figure 4:
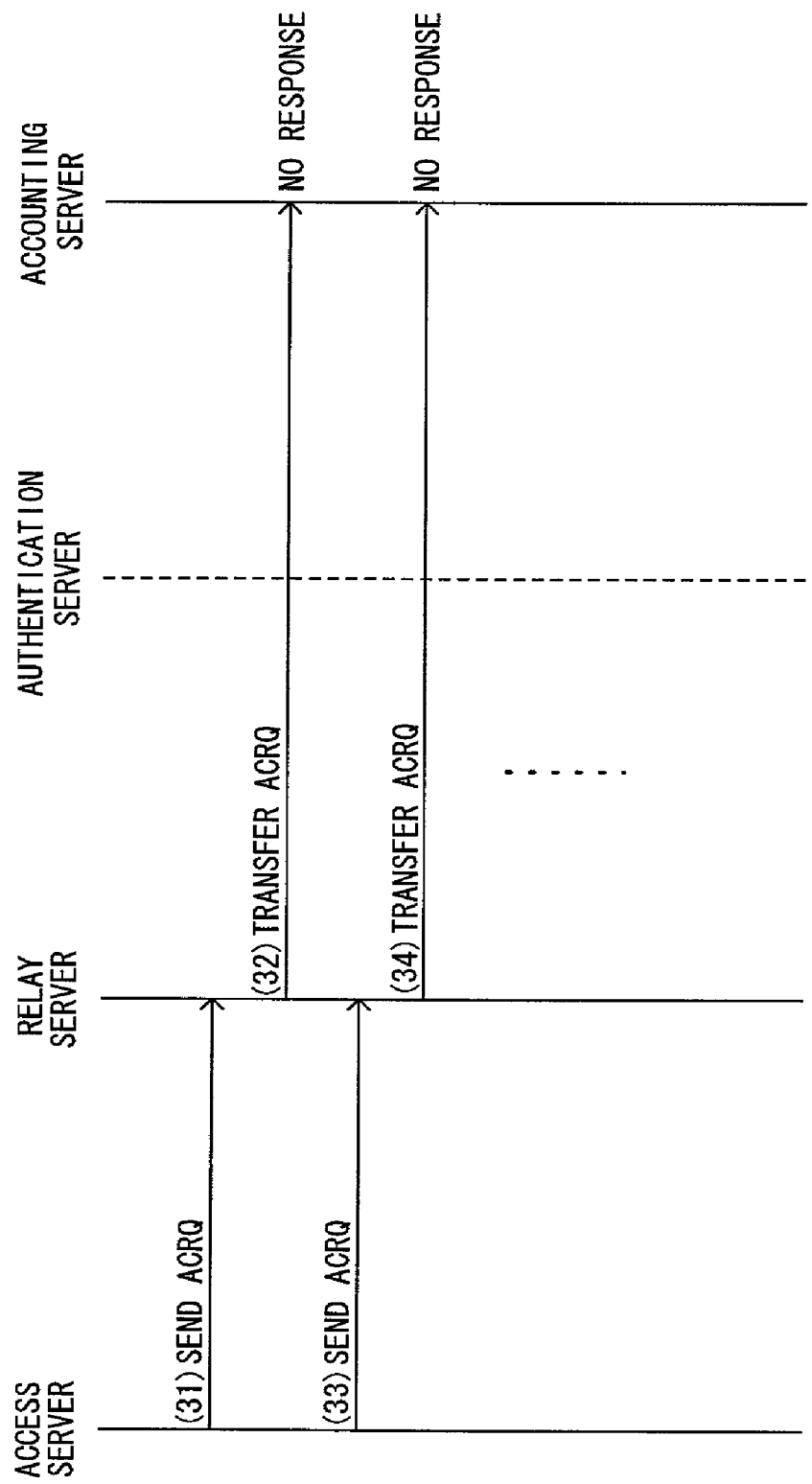
FIG. 4 is a diagram showing a conventional processing flow at the fault in an accounting server.
Figure 5:
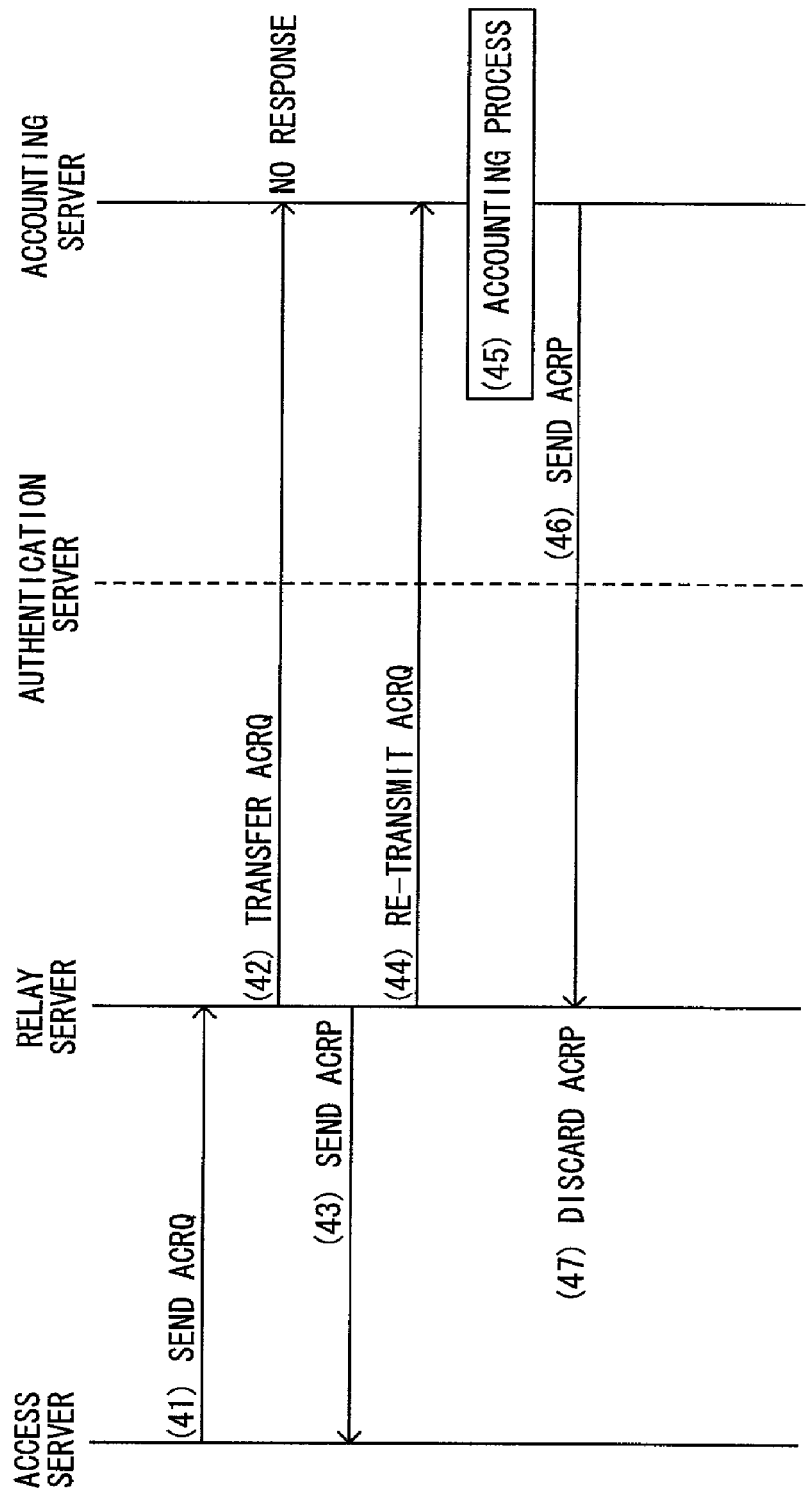
FIG. 5 is a diagram showing a processing flow at the fault in an accounting server in the preferred embodiment of this invention.

In this preferred embodiment, performing processings, such as ones shown in FIG. 5, prevents the congestion of the network AS such as one which occurs in FIG. 4. Namely, the access server A (3) generates and sends a packet of an accounting request to the relay server 5 (Step (41)). If the relay server 5 receives the packet of the accounting request from the access server A (3), it stores the packet into the storage device temporarily, specifies a RADIUS server of a transfer destination according to the user identification information such as the user ID included in the packet data, and performs processings such as changing a transmission destination of the packet. Then, the relay server 5 transfers the packet of the accounting request to the accounting server 13a (Step (42)). Up to these processings are the same as the conventional ones.

But, if the accounting server 13a is down, any accounting response is not sent to the relay server 5. Therefore, if the relay server 5 does not receive any accounting response from the accounting server 13a within a predetermined period, it stores the packet data of the accounting request into the proxy reply list storage 55, generates an accounting response according to the packet data of the accounting request, and replies the packet of the accounting response to the access server A (3) on behalf of the accounting server 13a (Step (43)). These processing prevents the access server A (3) from sending the same accounting request repeatedly. Incidentally, the relay server 5 registers the down of the accounting server 13a to a status table of the status table storage 57.

The relay server 5 reads out the packet data of the accounting request stored in the proxy reply list storage 55 in a predetermined cycle or at an arbitrary timing, and then, generates and sends a packet of an accounting request to the accounting server 13a (Step (44)). On this occasion, the relay server 5 specifies the accounting server 13a of a transmission destination according to the user ID included in the packet data, and performs a changing processing to extend delay time included in the packet data by elapsed time from time when the relay server 5 received the packet of the accounting request.

In the case that the accounting server 13a has already recovered, if it receives the packet of the accounting request from the relay server 5, it performs an accounting processing (Step (45)) Incidentally, in the case of an accounting request which represents a start, the accounting server 13a recognizes the start of accounting, and registers information for the start of accounting to the accounting DB 18. In the case of an accounting request which represents an end, the accounting server 13a recognizes the end of accounting, and registers information for the end of accounting to the accounting DB 18. Since information concerning the start time and the end time of the accounting was changed and registered in consideration with the delay time also in a conventional technique, changing the delay time by the relay server 5 allows the accounting server 13a to register correct information into the accounting DB 18. Namely, if this preferred embodiment is adopted, RADIUS servers do not need any modification or change.

Incidentally, in the case that the accounting server 13a has not recovered yet, the relay server 5 does not resend the packet of the accounting request, and it cancels sending the packet to the accounting server 13a at this moment.

If the accounting processing is performed, the accounting server 13a generates and sends a packet of the accounting response to the relay server 5 (Step (46)). If the relay server 5 receives the packet of the accounting response from the accounting server 13a, it stores the packet into the storage device temporarily. But, if the relay server 5 specifies the packet as that of the accounting response corresponding to the accounting request which it sent at Step (44), it discards the packet of the accounting response (Step (47)). It is because, since the relay server 5 has already replied on behalf of the accounting server 13a, it only causes the increase of the network traffic but no profit that the relay server 5 sends this packet to the access server A (3). Therefore, there is no further additional processing and no processing to be changed for the access server A (3) even if the relay server 5 replies on behalf of the accounting server 13a. Incidentally, the relay server 5 also performs a processing to discard the packet data of the accounting request for this processing, which is stored in the proxy reply list storage 55.

These processings prevent increasing traffic of the IP network 1 at the fault of the accounting server 13a. In addition, these processings prevent packet lost of an accounting request due to discard of a packet and so on because a buffer limit does not occur in an access server. In addition, since the access server does not resend any packet repeatedly, these processings can prevent the load of the access server from increasing. In addition, influence to other companies due to down of RADIUS servers of one company can be reduced. Furthermore, since the packet of the accounting request to be processed for the proxy reply are stored in the proxy reply list storage 55 of the relay server 5 and they are sent to an accounting server later just like a usual processing, fault recovery work in the accounting server is reduced drastically. If the processings of the accounting request are performed properly, a proper accounting processing can be performed.

Incidentally, although FIG. 5 does not distinguish between an accounting request which represents a start and an accounting request which represents an end, either or both of them can be performed in this preferred embodiment. However, from the viewpoint such as the processing load of the relay server 5, the capacity of the proxy reply list storage 55, and the reliability of accounting, processings such as ones of FIG. 5 may be preferably performed for the accounting request that represent an end. As mentioned above, whether or not the accounting request represents an end can be judged based on whether or not the value of an attribute Acct-Status-Type of the packet data is 2 (Stop).

Figure 6:
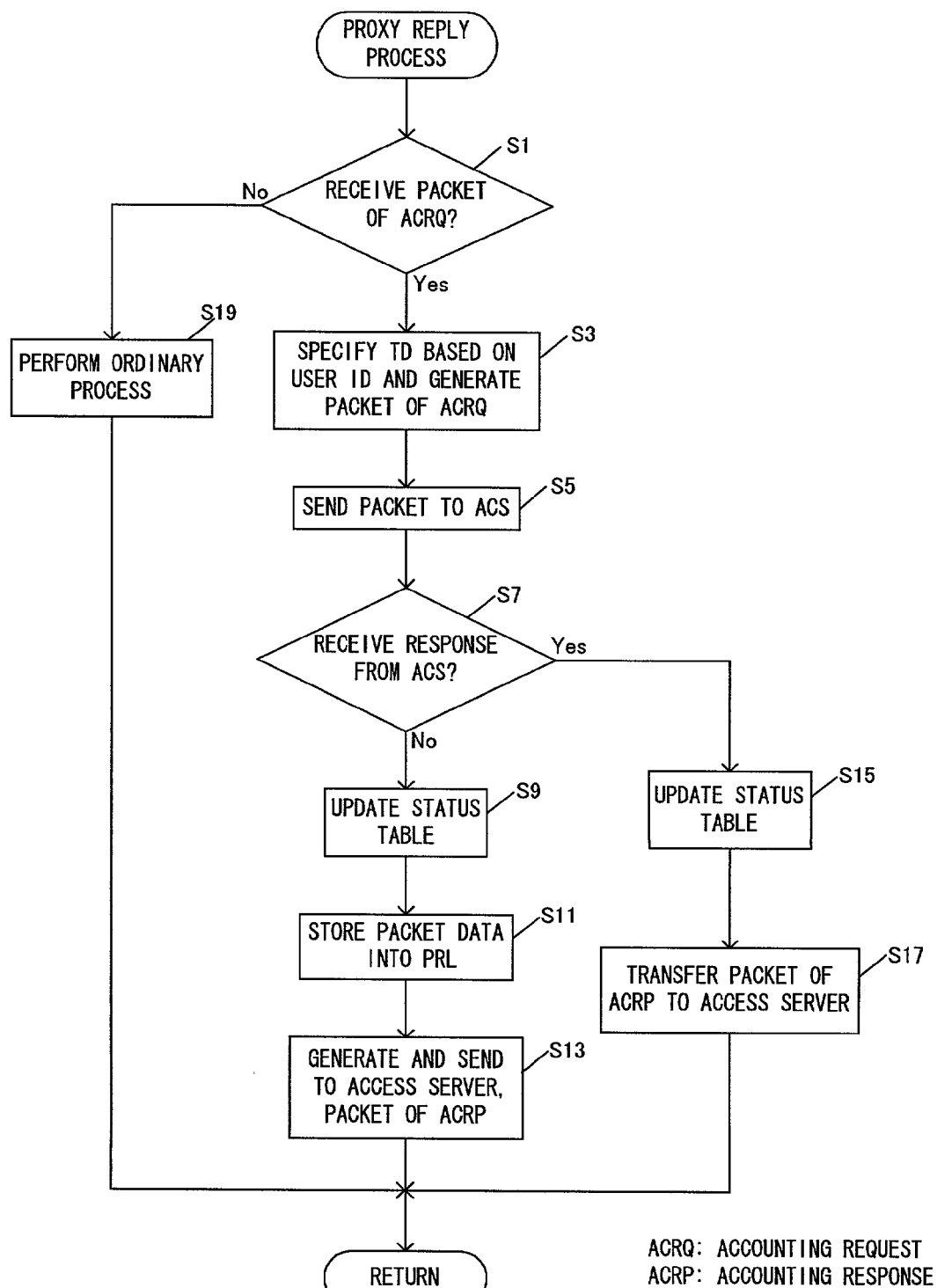
FIG. 6 is a diagram showing a processing flow of a relay server.

Next, processings of the relay server 5 to perform processings such as ones of FIG. 5 are explained in more detail. FIG. 6 shows processings of the proxy reply processor 51 in the relay server 5. In FIG. 6, if the proxy reply processor 51 receives a packet, it stores the packet into a storage device temporarily, and judge whether or not the packet are one of an accounting request (Step S1). Incidentally, it can be judged by a code of the packet.

Figure 7:
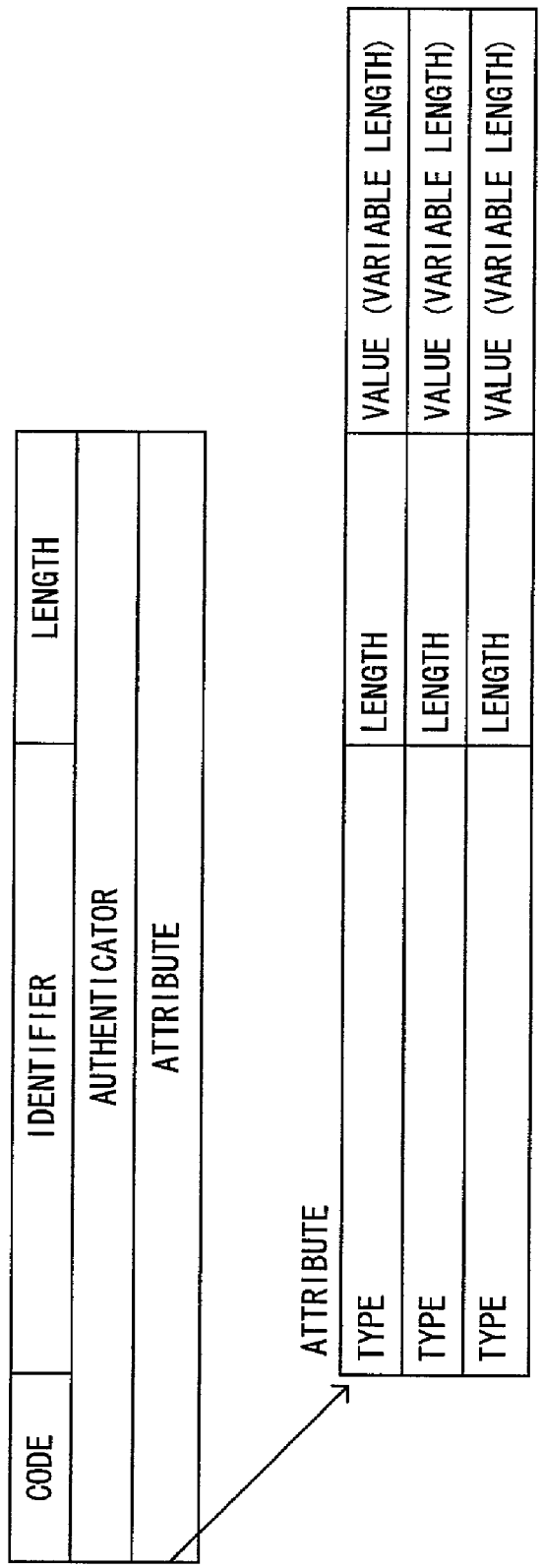
FIG. 7 is a diagram showing an example of a packet format.

FIG. 7 shows a packet format in RADIUS. As shown in an example of FIG. 7, a packet is composed of a code, an identifier, the length, an authenticator, and attributes. The attribute data has variable length and has the type, the length, and the variable-length value for each attribute. This packet data is encapsulated in a data field of a UDP packet.

The code represents the type of the packet. For example, "1" represents an authentication request (Access-Request), "2" represents an authentication response (Access-Accept) which represents acceptance, "3" represents an authentication response (Access-Reject) which represents rejection, "4" represents an accounting request (Accounting-Request), and "5" represents an accounting response (Accounting-Response). Therefore, the proxy reply processor 51 judges whether or not the code of the packet is "4". In addition, the identifier is data used for associating a request with its response. The length represents the length of the code, the identifier, the authenticator, and the attribute field. The authenticator is data for authenticating this packet and has the hash value of the code, the identifier, the length, and so on by MD5. The attributes will be explained later.

Incidentally, as mentioned above, this preferred embodiment may be applied to only the accounting request which represents the end. In that case, it must be confirmed further that the value of the attribute Acct-Status-Type is 2 (Stop).

If the packet is not the accounting request, an ordinary processing is performed (Step S19). Since this is not different from conventional techniques, its explanation is omitted here. Meanwhile, the packet is judged as the accounting request, the proxy reply processor 51 specifies an accounting server of a transfer destination based on a user ID (the value of an attribute User-Name) included in the attribute field of the received packet, generates a packet of an accounting request for transfer, and stores the packet into the storage device (Step S3). On this occasion, a status table stored in the status table storage 57 is used.

FIG. 8 shows an example of a status table. Group names such as company names are stored in a line for "group name". In the example of FIG. 8, a company A and a company B exist. Names of accounting servers which belong to each group are stored in a line for "accounting server". In the example of FIG. 8, an accounting server Rad 1 and an accounting server Rad 2 are installed in the company A. Namely, accounting servers of each group are not limited to one because of load distribution, backup and the like. An accounting server Rad 3 and an accounting server Rad 4 are installed in the company B. The operating status of each accounting server is stored in a line for "status". If an accounting server is operating, "up" is stored.

If an accounting server is down, "down" is stored. The number of times of resending packets of accounting requests to each accounting server is stored in a line for "the number of times of retry". In the example of FIG. 8, "0" is stored for each of Rad 1, Rad 2 and Rad 4, but "2" is stored for Rad 3.

In Step S3, the proxy reply processor 51 checks whether or not an accounting server of the transfer destination is operating, with reference to the status table. If the company A is specified as the transmission destination of the accounting request from, for example, a user ID, the proxy reply processor 51 specifies an accounting server which is operating from those belong to the company A. If there is no accounting server which is operating, the proxy reply processor 51 selects one of them. On this occasion, an accounting server with less number of times of retry may be selected.

The proxy reply processor 51 sends the packet of the accounting request to the specified accounting server (Step S5). The proxy reply processor 51 waits for a packet of an accounting response from the accounting server within a predetermined period. Then, the proxy reply processor 51 judges whether or not it received the packet of the accounting response from the accounting server (Step S7). Incidentally, even if the proxy reply processor 51 did not receive the accounting response from one server, as mentioned above, since there may be a plurality of accounting servers in a group, it may send a packet of the accounting request to another accounting server in the group, for example, until receiving the accounting response. In addition, referring to the status table, the proxy reply processor 51 may select an accounting server from those in the group in turn and send the packet of the accounting request.

If the proxy reply processor 51 received the packet of the accounting response from the accounting server, it stores the packet into the storage device temporarily and updates the status table stored in the status table storage 57 (Step S15). If "status" in the status table shows that the accounting server which replied the packet of the accounting response is "down", which means that the accounting server is down, it changes to "up", which means that the accounting server is operating, and resets "the number of times of retry" to "0". Incidentally, if the proxy reply processor 51 sent accounting requests to several accounting servers before receiving the accounting response, but it did not receive any response, it may be necessary to change the status for the accounting servers which did not reply the response. If "status" represents "up", the proxy reply processor 51 changes to "down". If "status" represents "down", the proxy reply processor 51 increments "the number of times of retry". Then, the proxy reply processor 51 specifies an access server of a requesting source according to an identifier of the packet and the like, and performs a processing such as to change a transmission destination of the packet of the accounting response, and then, it sends the packet of the accounting response to the specified access server (Step S17). Then, it shifts to the next processing.

Meanwhile, if the proxy reply processor 51 did not receive any packet of the accounting response from the accounting server, it updates the status table stored in the status table storage 57 (Step S9). As for accounting servers to which the proxy processor 51 sent the packet of the accounting request but which did not send any accounting response to the proxy reply processor 51, if "status" in the status table represents "up", the proxy reply processor 51 registers "down" into the status table. If "status" shows "down", the proxy reply processor 51 increments "the number of times of retry".

Then, the proxy reply processor 51 stores packet data of the accounting request into the proxy reply list stored in the proxy reply list storage 55 (Step S11).

The data stored in the proxy reply list is mainly a portion of the packet attributes, and it is like an example of FIG. 9. In the example of FIG. 9, "time of receipt", which is not the value of an attribute, of the relay server 5, User-Name, which is identification information such as a user ID, Service-Type (e.g. login (=1)), Framed-Protocol (e.g. PPP (=1)), Framed-IP-Address (an address of an access server), Framed-IP-Netmask, Framed-Routing, Filter-Id, Framed-MTU, Login-IP-Host, Login-Service, Login-TCP-Port, Callback-Number, Callback-Id, Framed-Route, Framed-IPX-Network, Class, Vendor-Specific, Session-Timeout, Idle-Timeout, Termination-Action, Called-Station-Id, Proxy-State, Login-LAT-Group, Framed-AppleTalk-Link, Framed-AppleTalk-Network, Framed-AppleTalk-Zone, Acct-Status-Type (e.g. start (=1) or end (=2)), Acct-Delay-Time, which is the delay time from time when the access server sent a re-transmitted packet first time, Acct-Input-Octets, Acct-Session-Id, which is an ID to identify a session, Acct-Authentic, Acct-Session-Time, which is elapsed time from the start of the session, Acct-Input-Packets, which is the number of packets which the access server inputs, Acct-Output-Packets, which is the number of packets which the access server outputs, Acct-Terminate-Cause, Acct-Multi-Session-Id, and Acct-Link-Count are included. These are mentioned in detail in RFC2865 and RFC2866, so these are not mentioned any further.

Then, the proxy reply processor 51 generates and sends a packet of an accounting response based on the packet data of the accounting request to the access server (Step S13). These processings prevent the access server from resending packets of accounting requests repeatedly, and consequently, these prevent causing the congestion of the network.

Figure 10:
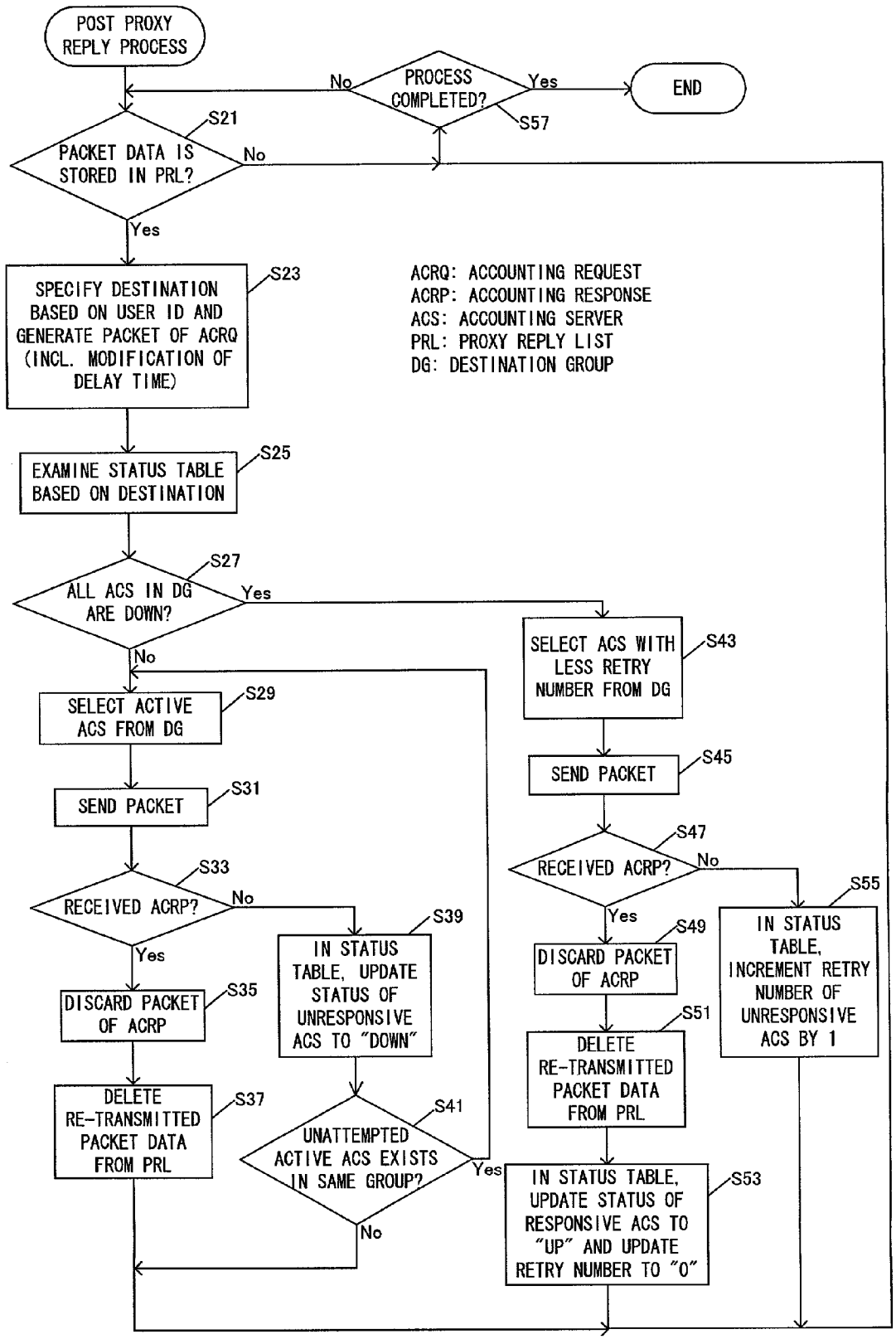
FIG. 10 is a diagram showing a processing flow of the relay server.

Next, processings of the post proxy reply processor 53 are explained with reference to FIG. 10. The post proxy reply processor 53 judges, for example, periodically or at an arbitrary timing, whether or not the packet data of the accounting request is stored in the proxy reply list in the proxy reply list storage 55 (Step S21). If packet data of the accounting request is stored in the proxy reply list, the post proxy reply processor 53 specifies a transmission destination based on the user ID (User-Name) included in the packet data, and it generates a packet of the accounting request (Step S23). Specifying the transmission destination is to specify a group (or a company). If one accounting server is included in the group, the accounting server is specified. Incidentally, since delay has occurred further from time when this packet had been transferred first time, the post proxy reply processor 53 adds elapsed time from receipt time of the packet of the accounting request to the value of delay time (Acct-Delay-time) and changes the value of delay time in the packet.

Then, the post proxy reply processor 53 examines the status table stored in the status table storage 57 based on the specified transmission destination (Step S25). Then, the post proxy reply processor 53 checks whether all accounting servers in the destination group are down (Step S27). If the status table shows that, at least one of accounting servers in the destination group is operating, the post proxy reply processor 53 selects one active accounting server from those in the destination group (step S29), and it sets the accounting server as a transmission destination and sends the packet of the accounting request to the accounting server (Step S31). Then, the post proxy reply processor 53 judges whether or not it received a packet of an accounting response within a predetermined period (Step S33). If the post proxy reply processor 53 received the packet of the accounting response from the accounting server, it stores the packet into a storage device temporarily. If the post proxy reply processor 53 confirms, based on the received packet data, that the accounting response corresponds to the re-transmitted accounting request, it discards the received packet of the accounting response (Step S35). Then, the post proxy reply processor 53 specifies and deletes the re-transmitted packet data from the proxy reply list in the proxy reply list storage 55, (Step S37). Then, the processing shifts to Step S57. This processing prevents resending accounting responses to the access server, which is a generation source of the accounting request. Namely, this prevents the increase of traffic over the IP network 1, and the configuration of the access server does not need to be changed.

Meanwhile, the post proxy reply processor 53 did not receive the packet of the accounting response within the predetermined period, in the status table in the status table storage 57, it updates "status" of accounting servers which did not reply any accounting response to "down" (step S39). Then, referring to the status table, the post proxy reply processor 53 judges whether or not any unattempted active accounting server exists in the same destination group (Step S41). If it exists, the processing returns to Step S29. Meanwhile, if it does not exist, the processing shifts to Step S57.

If it is judged at Step S27 with reference to the status table that all accounting servers in the destination group are down, the post proxy reply processor 53 selects an accounting server with less number of times of retry from those in the destination group (Step S43), and it sets the accounting server as a transmission destination and sends the packet of the accounting request to the accounting server of the transfer destination (Step S45). Then, the post proxy reply processor 53 judges whether or not it received the packet of the accounting response within the predetermined period (Step S47). If the post proxy reply processor 53 received the packet of the accounting response from the accounting server, it stores the packet into the storage device temporarily. If the post proxy reply processor 53 confirms based on the received packet data that the accounting response corresponds to the re-transferred accounting request, it discards the received packet of the accounting response (Step S49). Then, the post proxy reply processor 53 specifies and deletes the re-transmitted packet data from the proxy reply list in the proxy reply list storage 55 (Step S51). In addition, since it was recorded in the status table that accounting servers got down, the post proxy reply processor 53 updates "status" of the accounting server which replied the accounting response to "up" and "the number of times of retry" of the accounting server to "0" in the status table (Step S53). Then, the processing shifts to Step S57. This prevents resending accounting responses to the access server, which is the generation source of the accounting request. Namely, this prevents the increase of traffic over the IP network 1, and furthermore, the configuration of the access server does not need to be changed.

Meanwhile, if the post proxy reply processor 53 did not receive the packet of the accounting response within the predetermined period, it increments "the number of times of retry" of the accounting servers, which did not reply any accounting response, by "1" in the status table in the status table storage 57 (step S55). Then, the processing shifts to Step S57.

If it is judged at Step S21 that none of packet data is stored in the proxy reply list, the processing shifts to step S57. If it is judged at Step S41 that there is no unattempted active accounting server, after Step S37, Step S53 or Step S55, it is judged whether or not the processing must end. If the processing does not end, it returns to Step S21. Otherwise, the processing ends.

Though a preferred embodiment of this invention was explained above, this invention is not limited to this preferred embodiment. Although, for example, an example that this invention is applied to a system including RADIUS servers is explained above, if conditions which are similar to this embodiment, this invention can be applied to another system. In addition, access servers may be network devices such as routers, and these are dealt with as computers in this application. In addition, although functions, which relate to this invention, of the relay server 5 are divided into the proxy reply processor 51 and the post proxy reply processor 53, it is just one example and these functions can be divided by other ways. In addition, services provided by the company A or the company B are not only authentication or accounting, but also servers such as pay contents providing servers, may be installed.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method, executed by a relay computer, for communicating with a first computer and a second computer, said method comprising:
   receiving a packet from the first computer;
   specifying the second computer of a transfer destination from user identification information included in packet data;
   transmitting a first packet based on said packet data to the specified second computer of said transfer destination;
   recording data concerning operating status of said second computer of said transfer destination based on whether or not a response is received from said second computer of said transfer destination;
   upon detecting that said response is not received from said second computer of said transfer destination within a predetermined period performing each of:
      storing said packet data received from said first computer into a storage device of said relay computer,
      generating a response to make said first computer stop resending said packet, on behalf of said second computer,
      sending said response to said first computer to make said first computer stop resending said packet;
      reading out said packet data stored in said storage device at an arbitrary timing that is asynchronous with said storing, and specifying a second computer of a transfer destination from said user identification information included in the read packet data by using said user identification information included in the read packet data and said data concerning said operating status, and transmitting a second packet based on said read packet data to the specified second computer of said transfer destination; and
   upon detecting that said response is received from said second computer of said transfer destination within said predetermined period, discarding said response and said packet data that corresponds to said response and is stored in said storage device.

2. The method as set forth in claim 1, further comprising generating said second packet by at least changing data that represents delay time and is included in said read packet data, based on elapsed time from when said packet is received.

3. The method as set forth in claim 1, wherein said data concerning said operating status includes data for a number of times of resending said second packet.

4. The method as set forth in claim 1, further comprising judging whether said packet data is data for an accounting request.

5. The method as set forth in claim 1, further comprising judging whether said packet data is data for an accounting request for an end of an accounting.

6. The method as set forth in claim 1, wherein said second computer is a Remote Authentication Dial In-user Service (RADIUS) server.

7. A program embodied on a medium for causing a relay computer to communicate with a first computer and a second computer, said program comprising:

receiving a packet from the first computer;

specifying the second computer of a transfer destination from user identification information included in packet data;

transmitting a first packet based on said packet data to the specified second computer of said transfer destination; and recording data concerning operating status of said second computer of said transfer destination based on whether or not a response is received from said second computer of said transfer destination:

upon detecting that said response is not received from said second computer of said transfer destination within a predetermined period, performing each of:

storing said packet data received from said first computer into a storage device of said relay computer, generating a response to make said first computer stop resending said packet, on behalf of said second computer, sending said response to said first computer to make said first computer stop resending said packet, reading out said packet data stored in said storage device at an arbitrary timing that is asynchronous with said storing, and specifying a second computer of a transfer destination from said user identification information included in the read packet data by using said user identification information included in the read packet data and said data concerning said operating status, and transmitting a second packet based on said read packet data to the specified second computer of said transfer destination; and upon detecting that said response is received from said second computer of said transfer destination within said predetermined period, discarding said response and said packet data that corresponds to said response and is stored in said storage device.

8. The program as set forth in claim 7, further comprising generating said second packet by at least changing data that represents delay time and is included in said read packet data, based on elapsed time from when said packet is received.

9. The program as set forth in claim 7, wherein said data concerning said operating status includes data for a number of times of resending said second packet.

10. The program as set forth in claim 7, further comprising judging whether said packet data is data for an accounting request.

11. The program as set forth in claim 7, further comprising judging whether said packet data is data for an accounting request for an end of an accounting.

12. The program as set forth in claim 7, wherein said second computer is a Remote Authentication Dial In-user Service (RADIUS) server.

13. An apparatus for communicating with a first computer and a second computer, said apparatus comprising:

a unit that specifies, if a packet is received from the first computer, the second computer of a transfer destination from user identification information included in packet data;

a unit that transmits a first packet based on said packet data to the specified second computer of said transfer destination;

a unit that records data concerning operating status of said second computer of said transfer destination based on whether or not a response is received from said second computer of said transfer destination; and a unit, upon detecting that said response is not received from said second computer of said transfer destination within a predetermined period, performs each of:

storing said packet data received from said first computer into a storage device of said apparatus, generating a response to make said first computer stop resending said packet, on behalf of said second computer, sending said response to said first computer to make said first computer stop resending said packet, to said first computer;

reading out said packet data stored in said storage device at an arbitrary timing that is asynchronous with said storing, and specifying a second computer of a transfer destination from said user identification information included in the read packet data by using said user identification information included in the read packet data and said data concerning said operating status, and transmitting a second packet based on said read packet data to the specified second computer of said transfer destination, and upon detecting that said response is received from said second computer of said transfer destination within said predetermined period, discarding said response and said packet data that corresponds to said response and is stored in said storage device.

14. The apparatus as set forth in claim 13, further comprising a unit that generates said second packet by at least changing data that represents delay time and is included in said read packet, based on elapsed time from when said packet is received.

15. The apparatus as set forth in claim 13, wherein said data concerning said operating status includes data for a number of times of resending said second packet.

16. The apparatus as set forth in claim 13, further comprising a unit that judges whether said packet data is data for an accounting request.

17. The apparatus as set forth in claim 13, further comprising a unit that judges whether said packet data is data for an accounting request for an end of an accounting.

18. The apparatus as set forth in claim 13, wherein said second computer is a Remote Authentication Dial In-user Service (RADIUS) server.

* * * * *